(12) United States Patent
Hsu

(10) Patent No.: US 6,404,095 B1
(45) Date of Patent: Jun. 11, 2002

(54) INNER STATOR OF DIRECT DRIVING DRUM TYPE MOTOR

(76) Inventor: Chun-Pu Hsu, No. 19, Wu Chuang Liu Rd., Wu Ku Industrial Park, Taipei Hsien (TW)

(*) Notice: Subject to any disclaimer, the term of this patent is extended or adjusted under 35 U.S.C. 154(b) by 14 days.

(21) Appl. No.: 09/712,278

(22) Filed: Nov. 15, 2000

(30) Foreign Application Priority Data

May 26, 2000 (TW) ........................................ 89110311 A

(51) Int. Cl.$^7$ ................................................ H02K 1/12
(52) U.S. Cl. ........................ 310/254; 310/259; 310/208; 310/216
(58) Field of Search ................................. 310/254, 258, 310/259, 194, 185, 187, 208, 216, 218

(56) References Cited

U.S. PATENT DOCUMENTS

| | | | | |
|---|---|---|---|---|
| 5,592,731 A | * | 1/1997 | Huang et al. | 29/596 |
| 5,986,377 A | * | 11/1999 | Yamada et al. | 310/216 |
| 6,049,153 A | * | 4/2000 | Nishiyama et al. | 310/156 |
| 6,211,587 B1 | * | 4/2001 | Enomoto et al. | 310/52 |
| 6,300,702 B1 | * | 10/2001 | Jack et al. | 310/216 |

* cited by examiner

Primary Examiner—Nestor Ramirez
Assistant Examiner—Thanh Lam
(74) Attorney, Agent, or Firm—Rosenberg, Klein & Lee

(57) ABSTRACT

An assembled type motor outer stator for effectively improving the operation efficiency of a motor, and thus the volume occupy in the motor wire seat exciting coil is improved. Therefore, a high efficiency winding is achieved. By the assembled type motor outer stator, a motor can be produced with a simpler winding technology and the manufacturing efficiency of the motor is improved. Furthermore, the cost for the manufacturing device is reduced, and the strength of whole mechanic structure is preferable. To achieve the aforesaid object, the present invention provides an assembled type motor outer stator, wherein a conventional outer stator punched by silicon steel piece is exploded into an outer stator ring with a plurality of inlaying grooves, a plurality of stator teeth and a plurality of exciting coil wire seats. The wire seat is wound by a respective exciting coil and then the exciting coil passes through the root end of the stator teeth. The end is extended outwards with a distal end which is correspondent to the inlaying groove of the outer stator ring so that the two are inlayed combined. Finally, they are positioned and combined through the guide pin of the wire seat and the guide pin retaining plate, and then are welded to be formed as an assembled type motor outer stator.

9 Claims, 9 Drawing Sheets

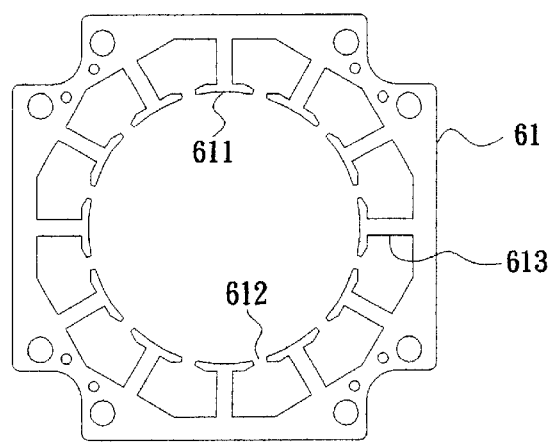
FIG. 2A
PRIOR ART
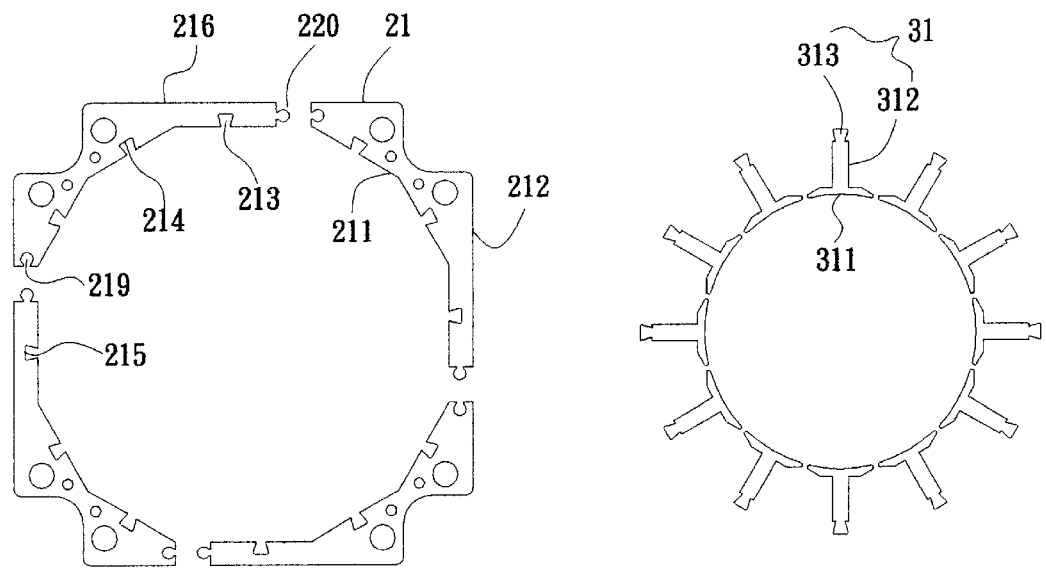
FIG. 2B
FIG. 2C
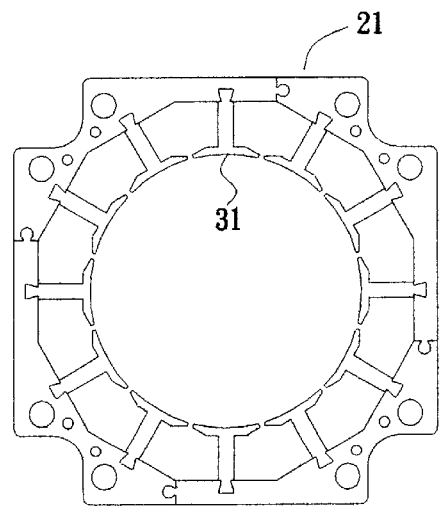
FIG. 2D

INNER STATOR OF DIRECT DRIVING DRUM TYPE MOTOR

FIELD OF THE INVENTION

The present invention relates to an assembled type motor outer stator, in which by the assembled type motor outer stator of the present invention, in the conventional winding way for a stator exciting coil inner rotor motor, the motor electromagnetic wave wire seat is separated from the outer stator independently. The winding of the exciting coils can be performed by using a cheap winding device (a roller type winding machine in manufacturing a transformer). Moreover, an assembly type inner rotor motor with high operation efficiency and high mechanic strength is formed. Since an inner rotor motor serves to provide a mechanic power. The requirement of operation efficiency and economic efficiency. The object of the assembled type motor outer stator is to reduce the production cost and to manufacture an inner rotor motor of a high mechanical strength.

BACKGROUND OF THE INVENTION

The bottleneck of a high efficiency motor is to wind exciting coils since a high efficiency motor needs a respective magnetic load and an electric load. The problem for electrical load is the size of the diameter of the stator exciting coil. A higher electric load represents a higher exciting current. To have a high exciting current needs an exciting coil with a larger diameter. Another, if it is desired to increase the exciting current of a motor, the diameter of the exciting coil must be further increased. Therefore, the volume occupation of a high wire groove exciting coil must be incremented. An optimum method for this is to use a linear winding. The opening of the stator wire groove must leave with a winding channel of 2 m/m for being used by a winding machine of an inner winding guide pin in CNC operation so that an inner winding guiding pin may pass through the opening of a stator teeth so as to accomplish a linear arrangement. The line opening must leave with a winding guide pin channel of 2 m/m and therefore, the winding space of the wire groove must be reduced. That is, the volume occupation of a linear arranged wire groove increases with about 50%.

A new method is disclosed for improving this phenomenon, in which in a iron core of the stator, it is cut from the center of a wire groove to cause the cut portion has a bendable connection structure so that the stator is arranged linearly and thus, each opening of the wire groove is opened greatly. In the aforesaid way, since the tooth end of the wire groove is wider than that of the tooth root, the insulating seat can not be inserted into the root end after being wound. A horizontal synchronous winding with CNC device is performed, so that the winding engineering of exciting coils are performed. Therefore, after the stator is assembled, a higher volume occupation of 80% of coils is achieved.

The aforesaid two winding ways have the same feature of using a CNC device. The exciting wires pass out of the through holes of winding guide pin and then are wound through a CNC device. In summary, the aforesaid prior art has the following problems:

1. Because using a high accuracy CNC operation, the accuracy and cost of the fixture must be improved.
2. Because using a high accuracy CNC operation, the quality of the operators must be improved, and thus, the training of the operators is complex and the salary thereof is increased.
3. The diameter of the winding must be confined by the machine, and thus the cost in machine is increased.
4. The winding speed of the winding guide pin mechanically controlled is too slow (60 to 800 rpm), and thus the production efficiency is too low.
5. The CNC winding device needs very high investment, and therefore, the manufacturing cost of motors is also incremented.

SUMMARY OF THE INVENTION

Since in the winding engineering in the prior art motor, the winding is arranged linearly, and thus, more space is occupied, and the motor operates effectively, while the whole cost is too high. Another, the production in winding is very low so that the cost of each motor is increased. This is not suitable in mass production. In the assembled type motor outer stator of the present invention, the guide pins in a CNC machine operation for arranging linearly winding exciting coil used in the prior art is not used so that the cost in the winding machine is reduced and the production efficiency is increased. In the assembled type motor outer stator of the present invention, the root ends of the stator wire grooves are separated from the outer ring of the inner stator with an equal angle, while the width of the separate distal end is not large than the root end.

A pair of correspondent jointing ends are formed at the distal end and the outer ring. Therefore, the insulating wire seat of the inner stator root ends can be formed in advance. The winding is performed by a roller type winding machine so that the cost is low and production efficiency is high. Moreover, the winding machine of the winding transformers can wind exciting coils on an insulating wire seat in a high rotary speed by a coaxial multiple winding way. This means that the winding efficiency can be greatly increased. In the whole, in the present invention, the technology for manufacturing a transformer by a coaxial multiple winding way can be used in the present invention. Moreover, a drum type outer rotor motor with a high operation efficiency and high mechanical strength can be manufactured in the present invention.

To achieve the aforesaid object, the present invention provides an assembled type motor outer stator, wherein a conventional outer stator punched by silicon steel piece is exploded into an outer stator ring 21 with a plurality of inlaying grooves 213, a plurality of stator teeth 31 and a plurality of exciting coil wire seats 41. The wire seat 41 is wound by a respective exciting coil 412 (FIGS. 3A to 3F and FIG. 4) and then the exciting coil 4 passes through the root end 312 of the stator teeth 31. The end is extended outwards with a distal end 313 which is correspondent to the inlaying groove 213 of the outer stator ring 21 so that the two are inlayed combined. Finally, they are positioned and combined through the guide pin 419 of the wire seat 41 and the guide pin retaining plate 51, and then are welded to be formed as an assembled type motor outer stator 10.

The various objects and advantages of the present invention will be more readily understood from the following detailed description when reading in conjunction with the appended drawing.

BRIEF DESCRIPTION OF THE DRAWINGS

FIG. 2A is a schematic view of a conventional outer stator portion.

FIGS. 2B to 2D are schematic views of the outer stator in the second embodiment of the present invention.

DETAILED DESCRIPTION OF THE PREFERRED EMBODIMENTS

Figure 1:
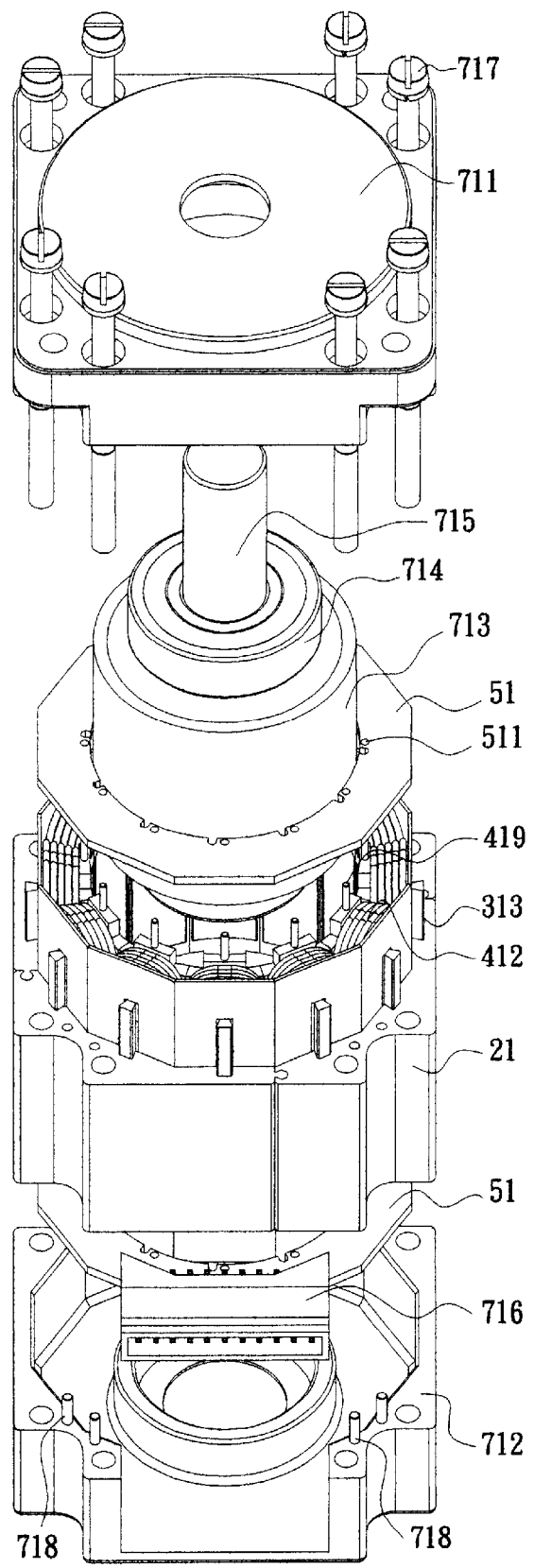
FIG. 1 is an assembled schematic view of the second embodiment in the present invention.
Figure 3C:
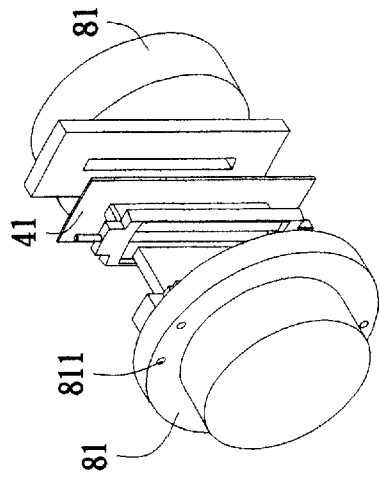
FIGS. 3A to 3F are schematic views showing a manufacturing process of a roller type winding.
Figure 3F:
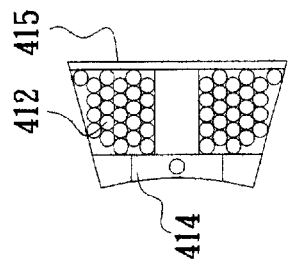
Figure 3B:
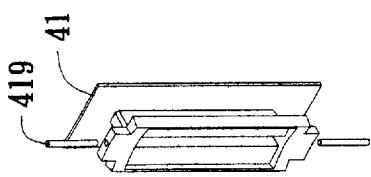
Figure 3E:
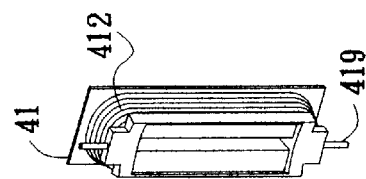
Figure 3A:
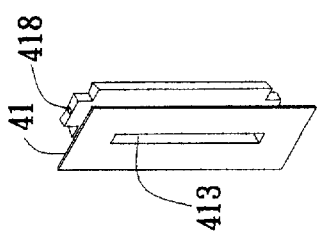
Figure 3D:
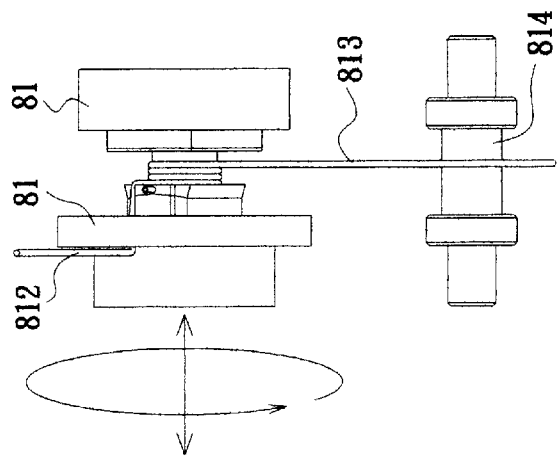
Figure 4:
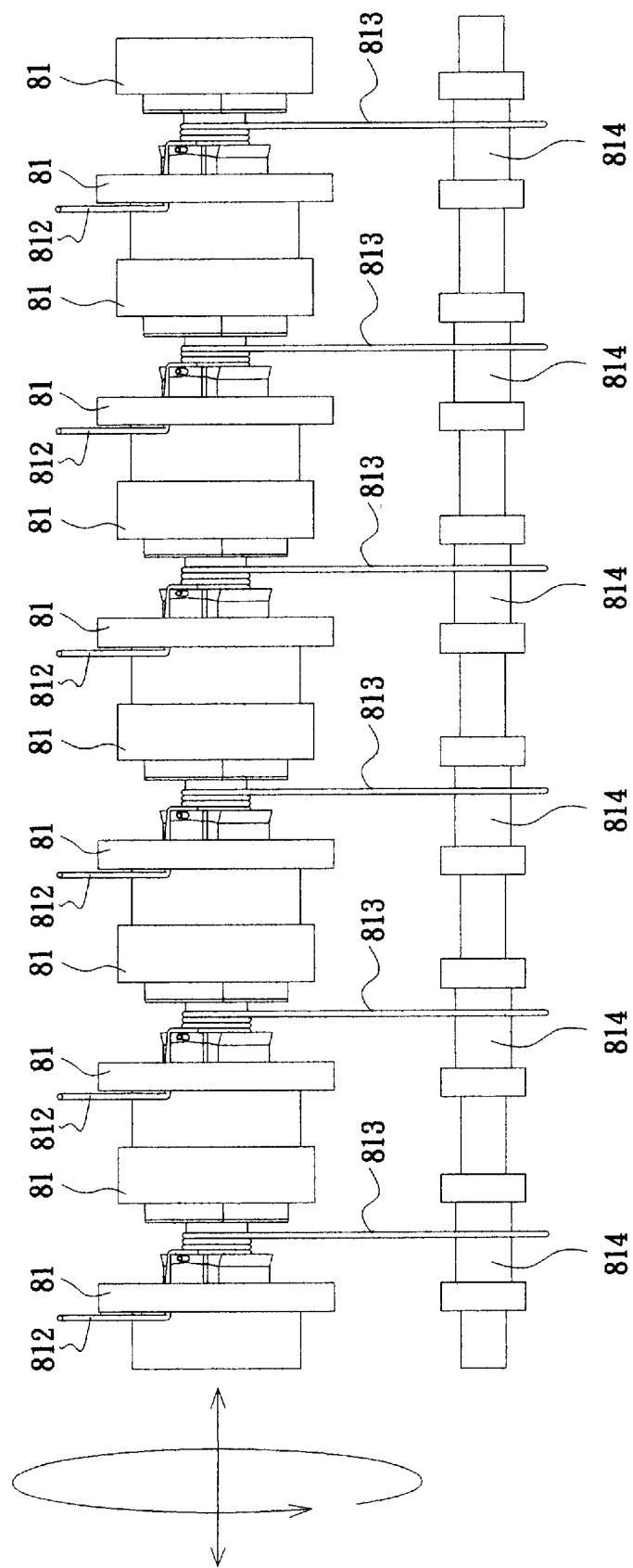
FIG. 4 is a schematic view showing a coaxial multiple roller winding.
Figure 5A:
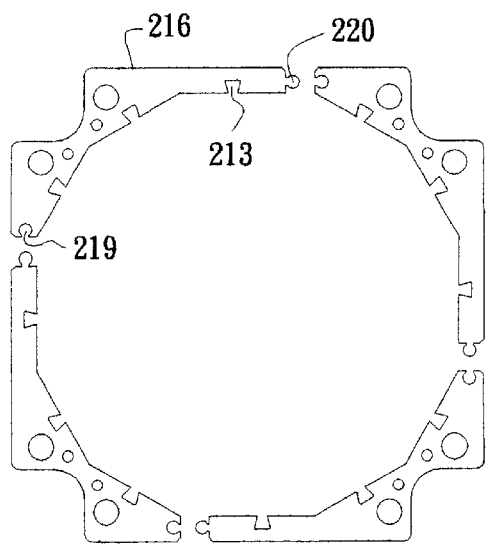
FIGS. 5A to 5G are plane views of the second embodiment in the present invention.
Figure 5B:
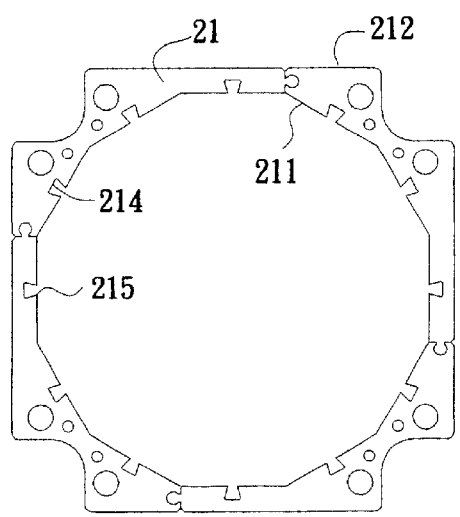
Figures 5C, 5D, 5E:
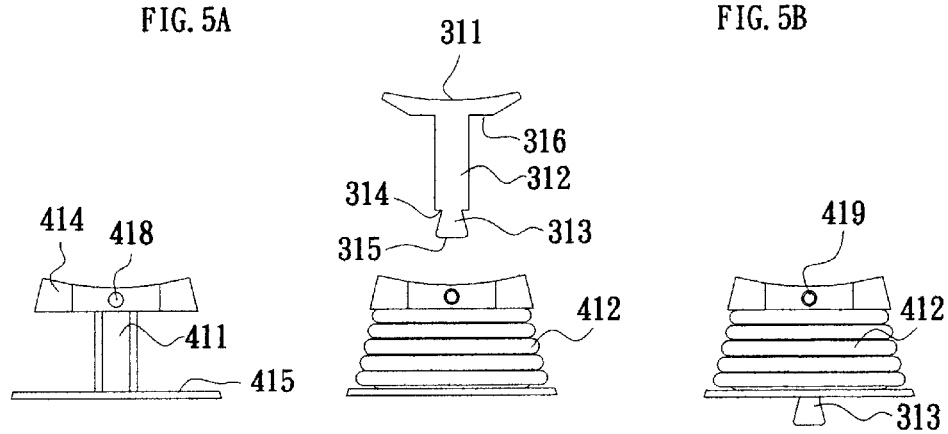
Figure 5F:
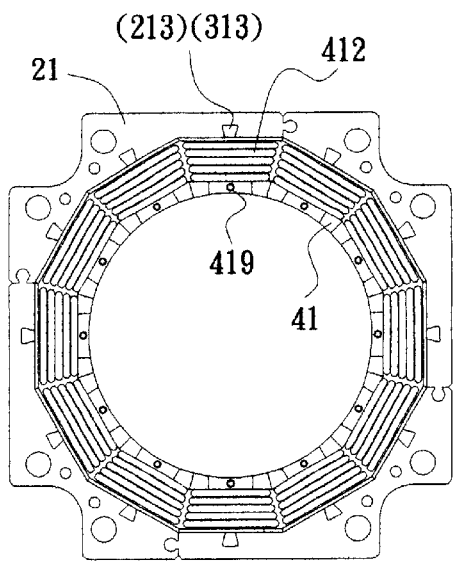
Figure 5G:
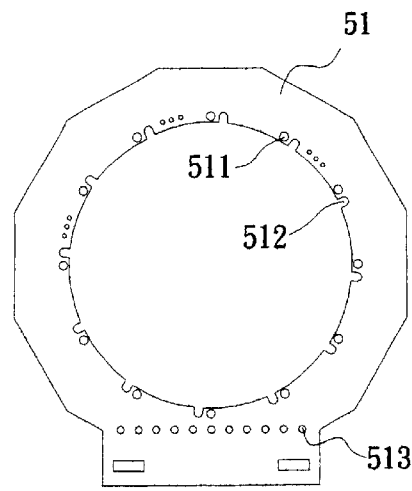
Figure 6B:
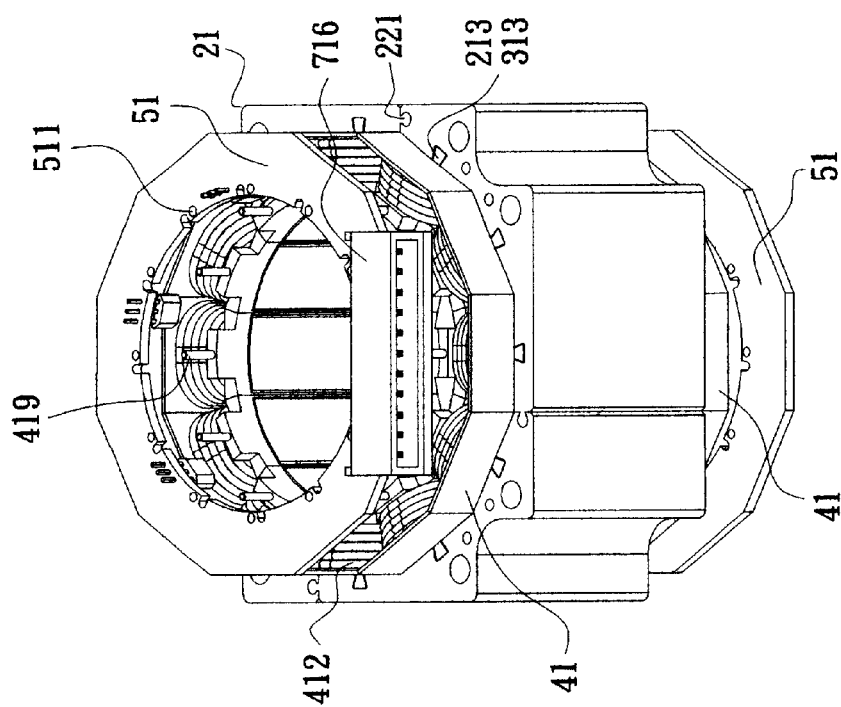
FIGS. 6A to 6B are schematic view showing the positioning of the guide pin retaining plate and wire seat guide pin.
Figure 6A:
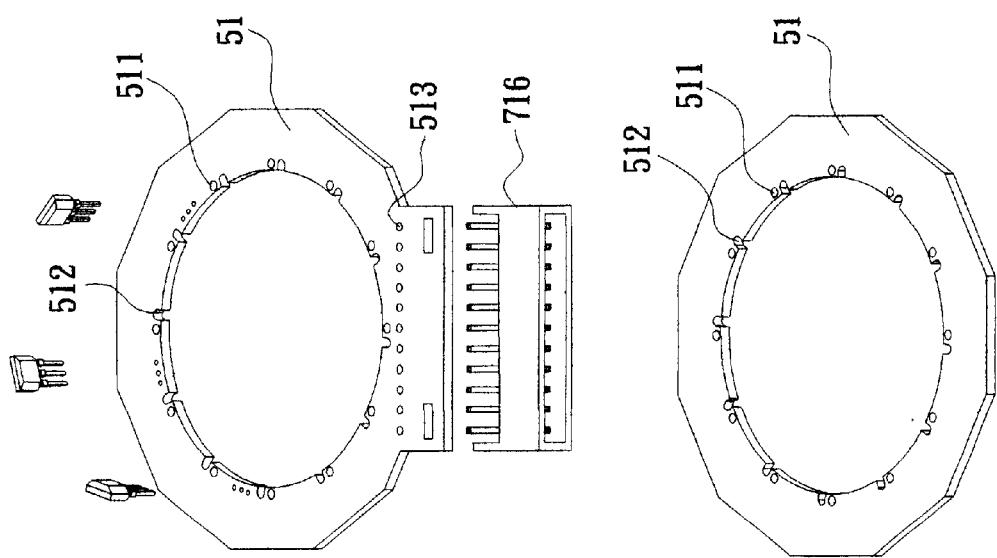
Figure 7A:
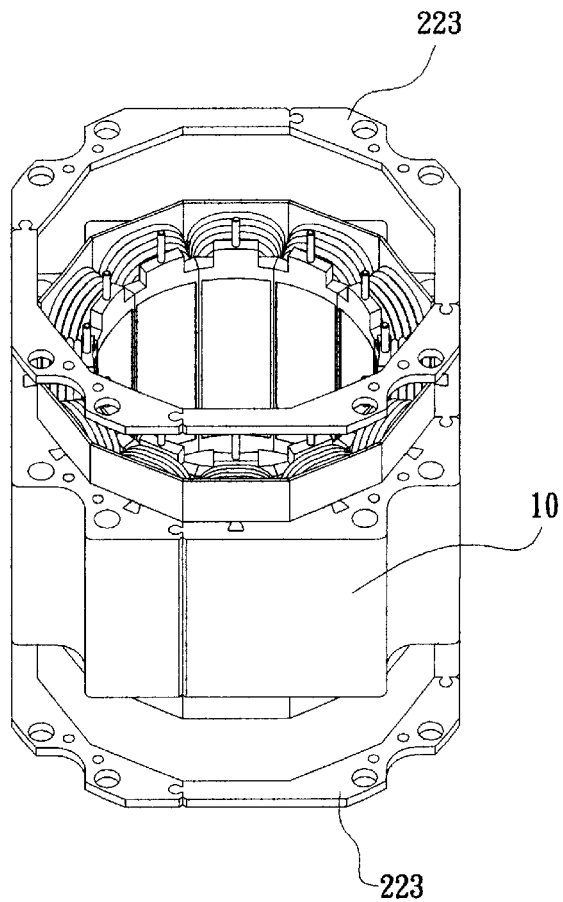
FIGS. 7A and 7B are assembled views showing the stator and end surface of the outer stator ring of the present invention.
Figure 7B:
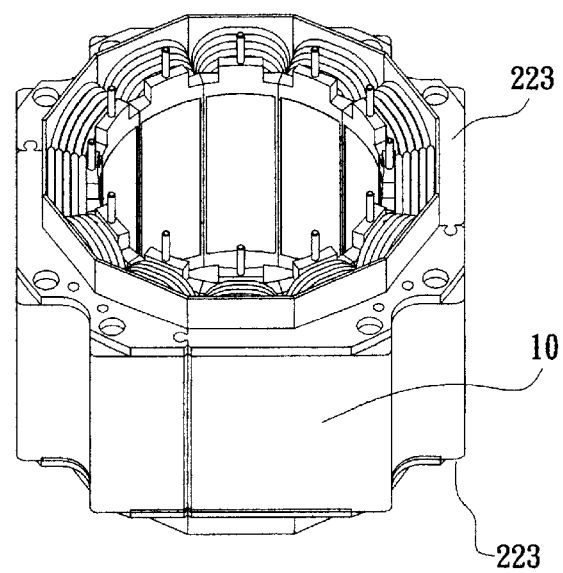

With reference to FIG. 2A, a conventional outer stator 61 includes tooth portions 611, winding openings 612, and tooth root ends 613. Referring to FIGS. 2B, 2C, and 2D and FIGS. 9A and 9B. the assembled type motor outer stator 10 includes the following components. An outer stator ring portion 21 is made of permeability silicon steel and is formed through punching and overlapping. The inner ring 211 is divided into a plurality of inlaying grooves 213 each spaced with an equal angle along a circumference of the inner ring and concave toward the outer ring 212. The width of the inner groove 214 of the inlaying groove 213 must be larger than the width of the opening 215 of the inlaying groove 213 (see FIG. 2B).

A plurality of stator teeth 31 having round arc end surface 311 is installed, which is made of permeability silicon steel and through punching and overlapping. The arc tooth end surface 311 is correspondent to the circumference of the outer rotor with a determined air gap therein. The distal end of the tooth root 312 is extended with a root distal end 313. The inner end of the root distal end 313 has a width smaller than that of the outer end 315 of the root distal end 313 and has a shape correspondent to the inlaying groove 213 of the outer ring 212. The two are tightly inlayed-combined. The maximum width of the outer end 315 of the root distal end 313 is not larger than the width of the root end 312.

There is a plurality of I shape insulating wire seat and a longitudinally vertical post 411 thereof serves for winding wires so as to be formed as an exciting coil 412. The inner hollow space in the vertical post 411 provides wire seat hollow end 413 for engaging with the tooth root end 312 of the stator tooth 31 and for engaging and releasing from the stator tooth 31.

The wire seat 41 passes through the exciting coil 412 (FIGS. 3A to 3F and FIG. 4), and then passes through the tooth root end 312 of the stator tooth 31. The FIGS. 3A to 3F discloses a coaxial roller clamp 81, a wire guide hole 811, a winding head 812, a exciting coil guide wire 813, a guide positioning roller 814, etc. Furthermore, tow end surfaces 414 and 415 are transversally installed at the front end rear end. The front end surface 414 provides to be jointed with the rear surface of an arc tooth end surface 311 after engaging with the stator tooth. The rear end surface 415 provides to resist against the outer ring 212 of the outer stator ring portion 21. The upper and the lower ends 416, 417 of the front end surface 414 and rear end surface 415 are installed with guide holes 418 and for engaging guide pins 419 to be protruded therefrom.

An exciting coil retaining plate 51 is installed with retaining hole 511 for being passed through by a plurality of guide pins 419 at the upper and lower ends 416, 417 of the wire seat 41. This design is used to strengthen the structure strength of the whole stator 21, after the outer stator ring 21, the stator tooth portion 31, the exciting coils 412 and the wire seat 21. By the retaining plate 51, the exciting coils 412 may be serially connected as a complete motor stator exciting coil loop through the conductive wires on the retaining plate 51. The exciting coil loop and the signal loop within the motor are connected to the motor control receptacle 716 on the retaining plate 51. Through the control receptacle 716, it is connected with the outer operation controller of the motor so as to become a complete control loop.

Referring to FIG. 1, the stator and the inner rotor of the present invention are assembled as a complete inner rotor motor. The inner rotor motor includes a motor lower cover 711, a motor upper cover 712, an inner rotor 713, a bearing 714, a shaft core 715, screws 717, etc.

Figure 8A:
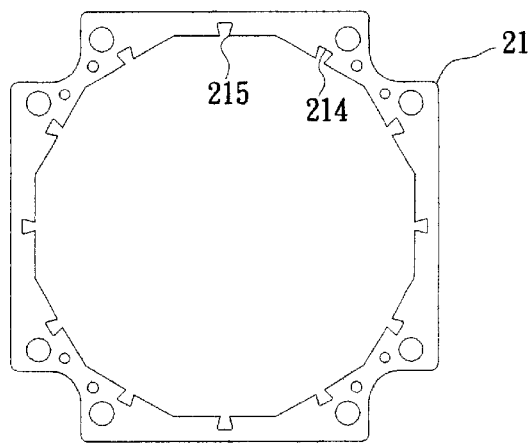
FIG. 8A is a schematic view of the outer stator ring and the wire seat separating body in the first embodiment of the present invention.
Figure 8B:
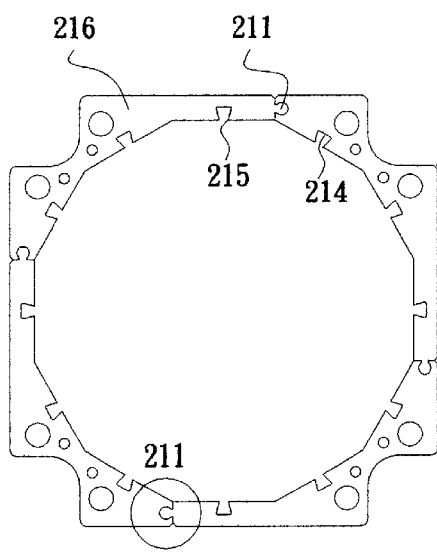
FIGS. 8B and 8C are a schematic views of the outer stator ring and the wire seat separating body in the second embodiment of the present invention.
Figure 8D:
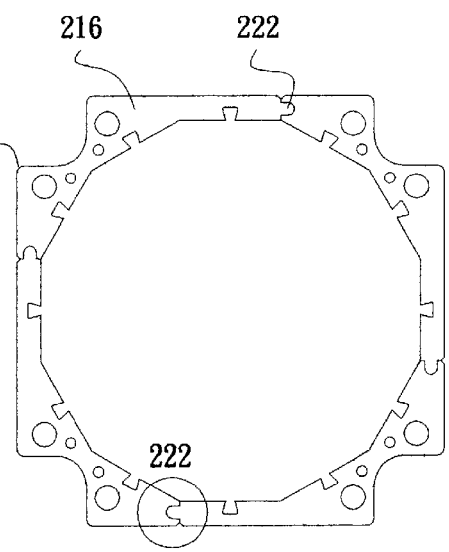
FIGS. 8D and 8E are a schematic views of the outer stator ring and the wire seat separating body in the third embodiment of the present invention.
Figure 8C:
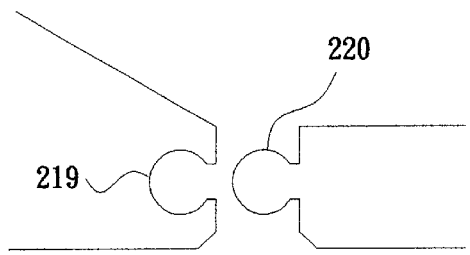

The outer stator portion 10 of the assembled type motor outer stator of the present invention has the outer stator ring 21 can be exploded into a plurality of equal unit parts 216. The left and right ends of each unit 216 are formed with respect to the right and left ends of the adjacent unit 216 through the engaged ends 219, 220 which can be tightly combined as 221 illustrated in the figure. Therefore, a complete and non-separable outer stator ring with fixing angle (as shown in FIGS. 8B, 8C) is formed.

Figure 8E:
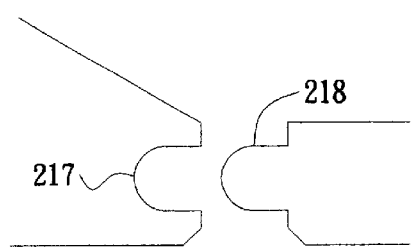
Figure 9A:
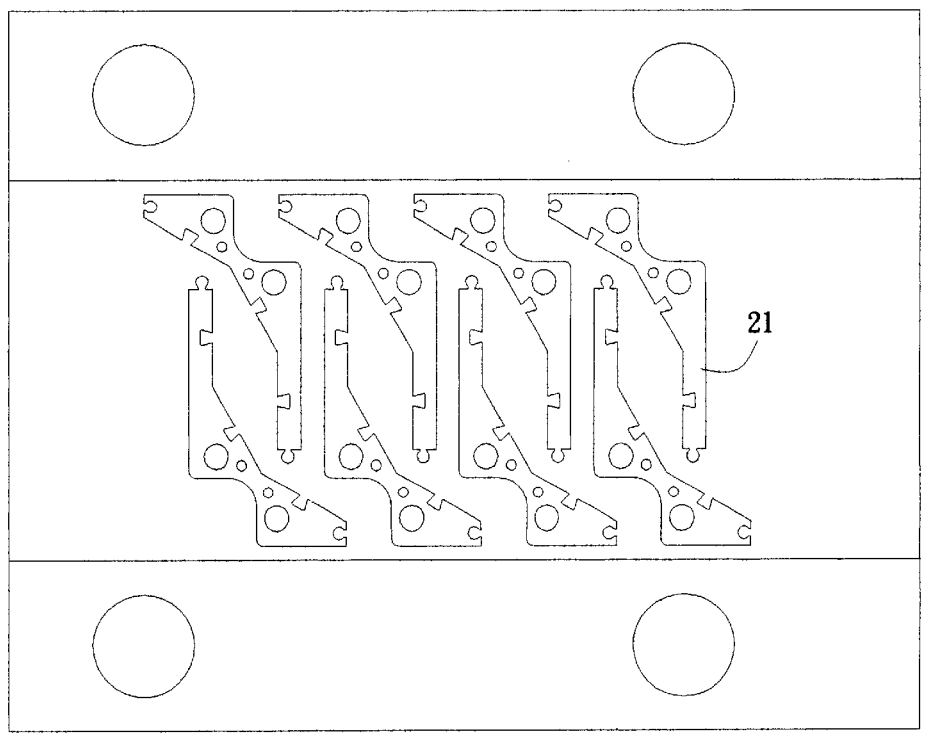
FIG. 9A is a schematic view showing the mold arrangement of the outer stator ring of the present invention.
Figure 9B:
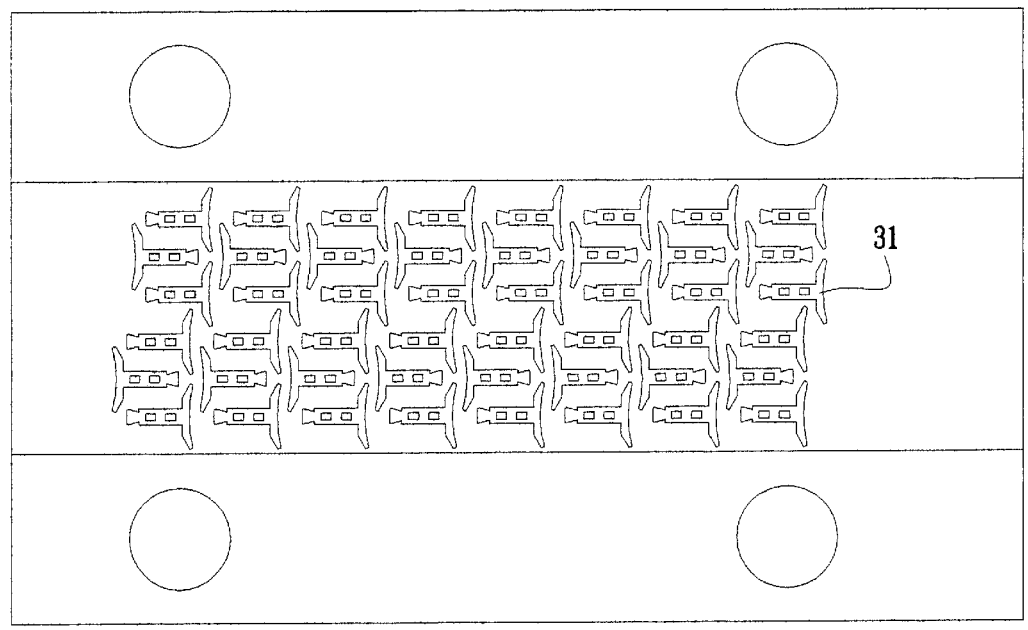
FIG. 9B is a schematic view showing the mold arrangement of the stator teeth in the present invention.

The outer stator portion 10 of the assembled type motor outer stator of the present invention has the outer stator ring 21 can be exploded into a plurality of equal unit parts 216. The left and right ends of each unit 216 are formed with respect to the right and left ends of the adjacent unit 216 through the engaged ends 217, 218 which can be tightly combined as 222 illustrated in the figure. Therefore, a complete and separable outer stator ring with fixing angle (as shown in FIGS. 8D, 8E) is formed.

The assembled type motor outer stator of the present invention has a motor outer stator 10, wherein the I shape tooth wire seat 41 can be divided into two independent bodies 420 (not shown). The two must be correspondent to each other and can be combined to be formed as a complete I shape tooth wire seat 41.

The assembled type motor outer stator of the present invention has a motor outer stator 10, wherein the wire head and wire tail of the exciting coil 412 wound around the I shape tooth portion wire seat 41 are wound and welded to guide pins 419 at the upper and lower ends of the wire seat 41, and then is communicated and welded to a conductive wire on the retaining plate 51 through the guide pin 419.

The assembled type motor outer stator of the present invention has a motor outer stator 10, wherein wire head and wire tail 421 of the exciting coil wound around the I shape tooth portion wire seat are directly welded to a copper hole 512 of the retaining plate 51, and then is electrically welded to a conductive wire 513 so as to be formed as a complete motor stator exciting coil loop.

The assembled type motor outer stator of the present invention has a motor outer stator 10, wherein the exciting coil 412 is wound around the I shape tooth portion wire seat 41 as a straight wire arrangement.

The assembled type motor outer stator of the present invention has a motor outer stator 10, wherein the exciting coil 412 is nonlinearly wound around the I shape tooth portion wire seat 41 as a non-straight wire arrangement.

The assembled type motor outer stator of the present invention has a motor outer stator 10, wherein the motor control receptacle 716 on the guide pin retaining plate 51 is replaced by signal conductive wires, and the retaining plate is connected to an outer operation controller of the motor through the signal conductive wires so as to be formed as a complete control loop.

The assembled type motor outer stator of the present invention has a motor outer stator 10, wherein the upper and lower end surface of the outer stator ring 21 are installed with respective end surface plates 223 for covering the inlaying groove 213 at the inner ring 211 and to cause that all the stator tooth root distal end 313 to be clamped in the inlaying groove 213 of the outer stator ring 21 so that the whole stator tooth portion 31 is tightly secured to the outer stator ring 21.

In the present invention the outer stator ring 21 and the stator tooth 31 are made of permeability silicon steel and are formed by punching and overlapping. By the special structural design, in mold arrangement, the molds can be tightly arranged so that the waste is reduced and therefore, the cost in material is saved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An assembled type motor outer stator comprising:
   an outer stator ring portion made of permeability silicon steel and formed through punching and overlapping; an inner ring thereof being divided into a plurality of inlaying grooves each spaced with an equal angle along a circumference of the inner ring and being concave toward the outer ring; a width of the inner groove of the inlaying groove is larger than the width of the opening of the inlaying groove;
   a plurality of stator teeth each having a round arc end surface being made of permeability silicon steel and being formed through punching and overlapping; the arc tooth end surface being correspondent to the circumference of the outer rotor with a determined air gap therein; a distal end of the tooth root being extended with a root distal end; an inner end of the root distal end having a width smaller than that of an outer end of the root distal end and having a shape correspondent to the inlaying groove of the outer ring; the two are tightly inlayed-combined; a maximum width of an outer end of the root distal end being not larger than a width of the root end;
   a plurality of I shape insulating wire seat; a longitudinally vertical posts thereof serving for winding wires so as to be formed as an exciting coil; an inner hollow space in the vertical post providing a wire seat hollow end for engaging with the tooth root end of the stator tooth and for engaging and releasing from the stator tooth; further, an upper and an lower end surface thereof being installed with guide holes for being inserted by guide pins to be protruded therefrom; and
   an exciting coil retaining plate being installed with retaining holes for being passed through by a plurality of guide pins at the upper and lower ends of the wire seat so as to strengthen the structure strength of the whole stator, after the outer stator ring, the stator tooth portion, the exciting coils and the wire seat being assembled, and by the retaining plate, the exciting coils being serially connected as a complete motor stator exciting coil loop through the conductive wires on the retaining plate.

2. The assembled type motor outer stator as claimed in claim 1, wherein a wire head and a wire tail of the exciting coil wound around the I shape tooth portion wire seat are wound and welded to a guide pin at upper and lower ends of the wire seat, and then is communicated and welded to a conductive wire on the retaining plate through the guide pin so as to be formed as a complete motor stator exciting coil loop.

3. The assembled type motor outer stator as claimed in claim 1, wherein a wire head and a wire tail of the exciting coil wound around the I shape tooth portion wire seat are welded to copper holes on the retaining plate, and is conductive through a conductive wire so as to be formed as a complete motor stator exciting coil loop.

4. The assembled type motor outer stator as claimed in claim 1, wherein the outer stator ring is exploded into a plurality of equal unit parts; left and right ends of each unit are formed with respect to the right and left ends of the adjacent unit through engaged ends thereof, the units are tightly combined; therefore, a complete and non-separable outer stator ring with fixing angle is formed.

5. The assembled type motor outer stator as claimed in claim 1, wherein the outer stator ring is exploded into a plurality of equal unit parts; left and right ends of each unit are formed with respect to the right and left ends of the adjacent unit through engaged ends thereof, the units are tightly combined; therefore, a complete and separable outer stator ring with fixing angle is formed.

6. The assembled type motor outer stator as claimed in claim 1, wherein the I shape tooth portion wire seat is longitudinally divided into two independent bodies, each of the independent body has its shape, as the two independent bodies are combined, then a complete I shape tooth portion wire seat is formed.

7. The assembled type motor outer stator as claimed in claim 1, wherein the exciting coil is wound around the I shape tooth portion wire seat as a straight wire arrangement.

8. The assembled type motor outer stator as claimed in claim 1, wherein the exciting coil is nonlinearly wound around the I shape tooth portion wire seat as a non-straight wire arrangement.

9. The assembled type motor outer stator as claimed in claim 1, wherein the upper and lower end surface of the outer stator ring are installed with respective end surface plates for covering the inlaying groove at the inner ring and to cause that all the stator tooth root distal end to be clamped in the inlaying groove of the outer stator ring so that the whole stator tooth portion is tightly secured to the outer stator ring.

* * * * *